United States Patent
Lammers et al.

(10) Patent No.: US 8,390,144 B2
(45) Date of Patent: Mar. 5, 2013

(54) OVERHEATING PROTECTION OF AN ELECTRIC CONTROL DEVICE

(75) Inventors: Christian Lammers, Stuttgart (DE); Matthias Schneider, Korntal-Muenchingen (DE); Steffen Reinhardt, Pforzheim (DE); Reinhard Rieger, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/561,052

(22) Filed: Sep. 16, 2009

(65) Prior Publication Data

US 2010/0072814 A1    Mar. 25, 2010

(30) Foreign Application Priority Data

Sep. 24, 2008   (DE) .......................... 10 2008 042 327

(51) Int. Cl.
*B60L 1/00*   (2006.01)

(52) U.S. Cl. ........................................................ 307/9.1

(58) Field of Classification Search .................... 307/9.1, 307/10.1, 117; 123/41.01; 361/24, 25, 103
See application file for complete search history.

(56) References Cited

U.S. PATENT DOCUMENTS

| | | | | | |
|---|---|---|---|---|---|
| 6,005,761 | A | * | 12/1999 | Izawa et al. .................... | 361/103 |
| 6,116,513 | A | * | 9/2000 | Perhats, Sr. .................... | 237/2 A |
| 2004/0264030 | A1 | * | 12/2004 | Yang ................................ | 360/69 |

FOREIGN PATENT DOCUMENTS

DE         197 12 445         10/1998

* cited by examiner

*Primary Examiner* — Daniel Cavallari
(74) *Attorney, Agent, or Firm* — Kenyon & Kenyon LLP

(57) ABSTRACT

A method for operating an electric control device for at least one power unit of a motor vehicle, an operating temperature range being assigned to the control device, and the control device being automatically switched off if its temperature exceeds the operating temperature range. A switch-on of the automatically switched-off control device may be implemented only if its temperature is within the operating temperature range. Furthermore, a corresponding electric control device.

7 Claims, 2 Drawing Sheets

OVERHEATING PROTECTION OF AN ELECTRIC CONTROL DEVICE

FIELD OF THE INVENTION

The present invention relates to a method for operating an electric control device for at least one power unit of a motor vehicle, the control device being assigned an operating temperature range, and the control device being automatically switched off if its temperature exceeds the operating temperature range.

BACKGROUND INFORMATION

It is known to switch off electric control devices during operation if they become too hot. This occurs when the temperature of the control device exceeds a permissible temperature range, i.e., the operating temperature range. The switch-off prevents damage within the control device to heat-sensitive components of which the control device is made up. If the switched-off control device is switched on again, it will be uncertain whether the control device is still overheating or has cooled down sufficiently until the temperature has been recorded. If it is overheated, then the brief operation until the temperature has been detected, and an associated renewed switch-off of the control device can damage or destroy the control device.

German Patent No. DE 197 12 445 describes a system for controlling and/or regulating operating sequences in a motor vehicle using an electric circuit. If the temperature of the electric circuit exceeds one of a plurality of threshold values, then an action assigned to the threshold value will be implemented. This measure may consist of restricting the functionality or deactivating the electric circuit.

There is a need for a method that reliably protects the control device from damage and destruction by overheating following a switch-off.

SUMMARY OF THE INVENTION

According to the present invention, the automatically switched-off control device may be switched on again only if its temperature is within the temperature range. In this way the control device is always operated only within its operating range. As soon as the temperature of the control device rises above the operating range, the control device is switched off and can be switched on again only after sufficient cooling has taken place.

According to a further development of the method, it is provided to use as a power unit a drive assembly of the motor vehicle, a transmission, in particular an automatic transmission, of the motor vehicle, or a motor vehicle component controlled and/or regulated with the aid of the control device. Thus, the method is able to be used for all control devices in a motor vehicle. Furthermore, the term control device is to be understood as any computer unit of the motor vehicle that includes protection against overheating by deactivation.

According to one further development of the present method, the temperature is acquired, in particular measured, with the aid of a temperature acquisition of the control device when the control device is switched on and/or when it is automatically switched off. The temperature acquisition determines the temperature that prevails in the control device. This may be done by a measurement. Furthermore, the use of a temperature model or calculations of characteristics curves is conceivable. Because of the temperature acquisition in the activated state of the control device, it is possible to activate the control device only partially when switching it on, and to acquire only the temperature initially in order to then make a decision, based on the temperature and the operating temperature range, as to whether the control device is to be switched on fully. For an acquisition of the temperature in an automatically deactivated control device, no deactivation of the temperature acquisition takes place when the control device is switched off automatically. It is therefore possible to detect the temperature of the control device while the control device is partially switched off. For the production of corresponding control devices it is especially advantageous if these two options are selectable with the aid of a bond option. This increases the flexibility during the production and leads to economical production methods.

According to one further development of the method, the temperature acquisition is switched off when the control device is switched off manually but not automatically. This has the advantage that in a selective manual deactivation energy is saved for the provision of the temperature acquisition. Within the framework of this application, a control device which is switched off manually is a control device that is switched off properly and completely.

According to one development of the present method, a stored operating temperature range is used as an operating temperature range. It may advantageously be determined for the control device in advance by a measurement or on the basis of operating temperature ranges of the components of the control device, and then be stored. Furthermore, it is conceivable to use different operating temperature ranges in order to switch off the control device at different temperatures, for example as a function of the operating state of the motor vehicle, such as standstill or driving.

According to one development of the present method, the control device is automatically switched on following its automatic switch-off. This is advantageous inasmuch as no external intervention is required for the reactivation of the control device. As a consequence, the control device is operable again as soon as possible without reducing a protection against damage by overheating.

Furthermore, the present invention relates to an electric control device for at least one power unit of a motor vehicle, in particular for implementing the afore-described method, the control device being assigned an operating temperature range, and the control device including a temperature acquisition device to detect the temperature of the control device, as well as an automatic switch-off that automatically switches the control device off if its temperature exceeds the operating temperature range, the automatic switch-off and the temperature acquisition device jointly forming an excess-temperature switch-on lock for the control device.

According to one further development of the device, the temperature acquisition device has at least one temperature sensor. In this way the correct temperature triggering the switch-off, the switch-on lock and/or the automatic switch-on, is able to be acquired directly.

DETAILED DESCRIPTION

Figure 1:
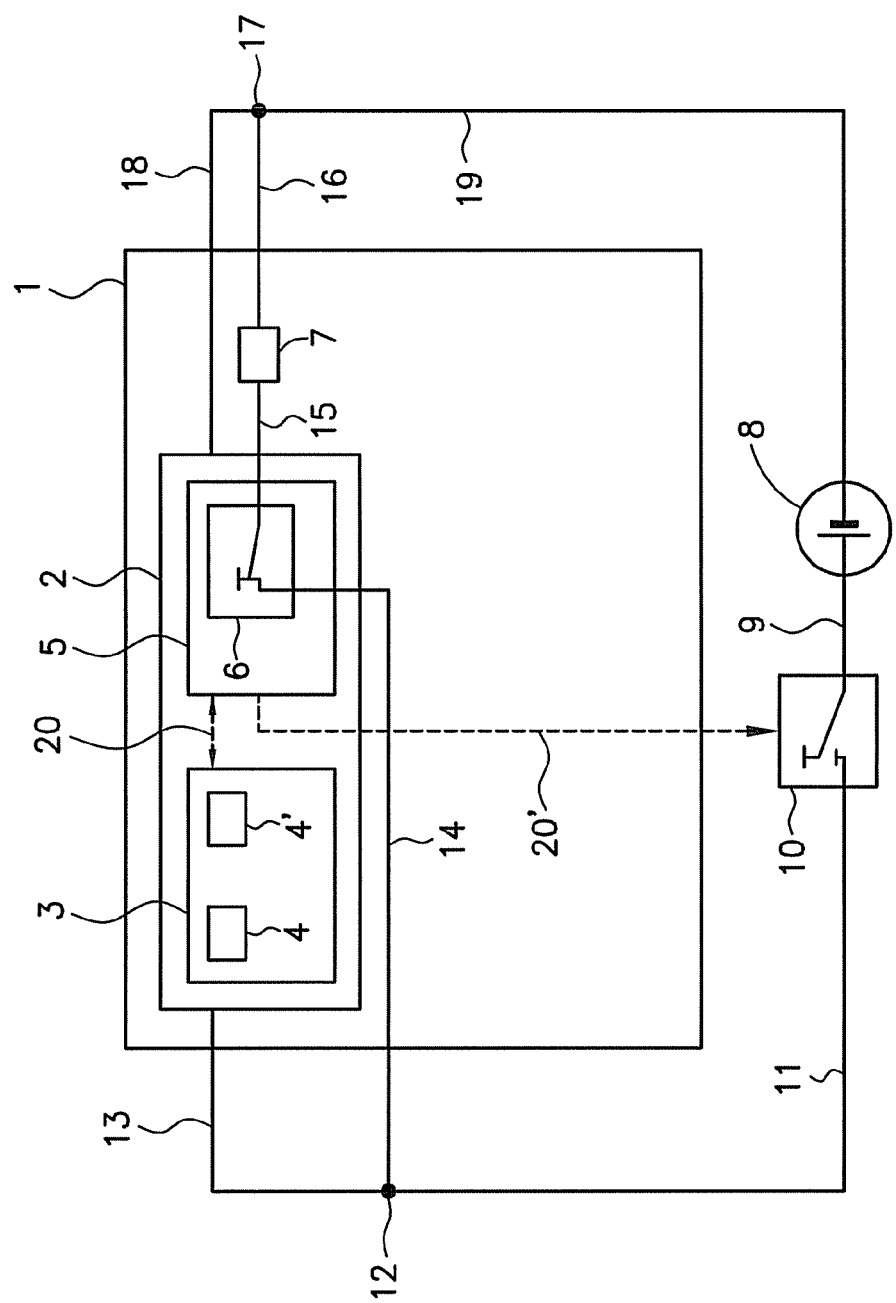
FIG. 1 shows a schematic illustration of an electric control device.

FIG. 1 shows a schematic representation of an electric control device 1, which includes an overheating temperature switch-on lock 2. Overheating temperature switch-on lock 2 is made up of a temperature acquisition device 3, which has a temperature sensor 4 and a memory 4', as well as an automatic switch-off 5, which is equipped with a switch 6. In addition, control device 1 has control electronics 7. Control device 1 is supplied with a supply voltage by a voltage source 8. Voltage source 8 is connected to a main switch 10 via a line 9. Main switch 10 is connected to a node 12 by a line 11. A second line 13, which supplies the supply voltage to excess temperature switch-on lock 2, extends from node 12. Moreover, there is an additional line 14, which starts at node 12 and extends to switch 6. Beginning at switch 6, a line runs to control electronics 7, which is connected to node 17 via a line 16. Node 17 is also connected to excess temperature switch-on lock 2, via a line 18, for the supply of voltage. Node 17 is connected to voltage source 8 with the aid of a line 19 in such a way that it is not directly connected to line 9. For the exchange of data, temperature-acquisition device 3 is connected to automatic switch-off 5 via a line 20, which is shown in the form of a dashed line. Furthermore, automatic switch-off 5 is able to open main switch 10 for a manual, complete switch-off of control device 1, via a line 20' shown as a dashed line.

FIG. 1 shows a simplified diagram of control device 1 in order to illustrate the method of the present invention. Control device 1 controls a drive unit (not shown) of a motor vehicle (not shown). To this end, it is supplied with voltage from voltage source 8, provided main switch 10, which constitutes the ignition in a motor vehicle, for example, is closed. Excess temperature switch-off lock 2 and control device 1 have two separate lines 13 and 14, respectively, for the supply of voltage, which enter control device 1 via lines 13 and 14, and which leave control device 1 via lines 18 and 16. The temperature of control device 1 is acquired with the aid of temperature sensors 4 and compared to the stored operating temperature range in memory 4'.

In a first development of control device 1, in the event of an excess temperature, automatic switch-off 5 is triggered via line 20 to the effect that the voltage supply for control electronics 7 is cut off with the aid of switch 6. This induces an automatic switch-off of control device 1, which protects control electronics 7, and thus control device 1, from overheating. It should be pointed out that excess temperature switch-off lock 2 continues to be supplied with voltage after the automatic switch-off of control device 1. Because of the continued supply of voltage to excess temperature switch-on lock 2, it retains its ability to monitor the temperature of control device 1. As soon as the temperature of control device 1 lies within the operating range, this will be detected by temperature acquisition device 3 via renewed comparison of the temperature of temperature sensor 4 with the operating temperature range from memory 4' and forwarded to automatic switch-off 5 via line 20. In this case it is able to close switch 6 and thus apply voltage to control electronics 7, thereby implementing an automatic switch-on of control device 1. Manual deactivation of control device 1 by opening main switch 10 results in a deactivation of entire control device 1 and thus a deactivation of control electronics 7 as well as excess temperature switch-on lock 2.

In a second development of control device 1, if an excess temperature occurs, automatic switch-off 5 is controlled via line 20, so that it separates the voltage supply for control electronics 7 with the aid of switch 6 and then opens main switch 10 via line 20'. Thus, control device 1 is switched off completely. As soon as a reactivation takes place, temperature acquisition device 3 first checks, in the manner already described, whether overheating of control device 1 has occurred, switch 6 remaining open for the duration. If this is not the case, automatic switch-off 5 closes switch 6 in order to continue the supply of voltage to control electronics 7.

Figure 2:
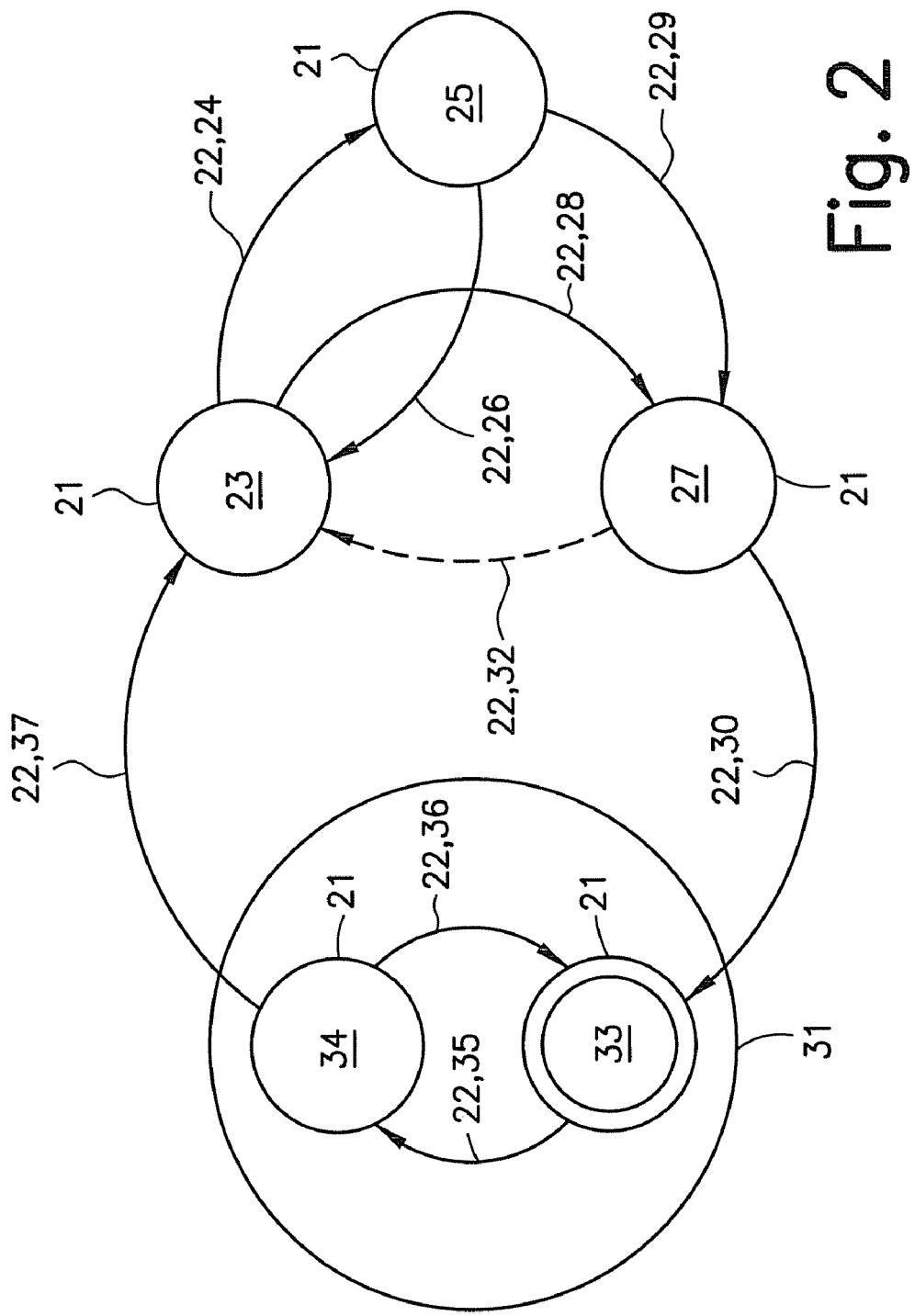
FIG. 2 shows a flow chart of the method according to the present invention.

FIG. 2 shows a schematic illustration of the method according to the present invention. To this end, states 21 are illustrated by circles and connected by way of transitions 22. Via a state transition 24, a working state 23 is able to transition into one of a plurality of working modes 25 and to be returned from there to working state 23 via a state transition 26. State transitions 24 and 26 are induced by external systems and events. Starting from working state 23 and working mode 25, control device 1 is able to transition into a switch-off mode 27 with the aid of state transitions 28 and 29 in the event of overheating. In switch-off mode 27, control device 1 is automatically deactivated. The renewed switch-on takes place via state transition 30, which leads from switch-off mode 27 to a manual switch-on mode 31. The renewed switch-on may also take place in a state transition 32, which leads to working state 23 and constitutes an automatic switch-on of control device 1. Manual switch-on mode 31 is made up of a reset mode 33 and a run-up mode 34. Reset mode 33 and run-up mode 34 may transition into one another by manual, i.e., externally actuated, state transitions 35 and 36, in order to reactivate control device 1. Once run-up mode 34 has been implemented, it is able to transition into working state 23 via state transition 37.

In one development the two developments of control device 1 differ in state transitions 30 and 37 from and into manual switch-on mode 31. The first development results in a check at state transition 30 by temperature acquisition device 3 as to whether a temperature prevails that exceeds the operating temperature range. If this is the case, automatic switch-off 5 will not switch off control device 1 in its entirety, but only control electronics 7, using switch 6. In the second development, following the automatic switch-off, temperature acquisition device 3 carries out a check at state transition 37 as to whether control device 1 has a temperature that exceeds the operating temperature range. To this end, only excess temperature switch-on lock 3 is initially supplied with voltage via the main switch. After the check has been completed successfully, control electronics 7 will then be supplied with voltage via switch 6.

The automatic activation via state transition 32 takes place in the same manner as the manual activation via manual switch-on mode 31, no external intervention being required for activating control device 1. In the first development, an automatic switch-on after a certain period of time may take place for this purpose, whereby the temperature of control device 1 is checked first. In the second development, once the temperature is within the operating temperature range, control device 1 is able to be switched on automatically since the temperature is recorded continuously.

Both developments may be stored during the production of control device 1 and selected in the manufacturing process with the aid of a bond option.

Another safety aspect depends on the use of temperature sensor 4. To prevent a malfunction of temperature sensor 4, it is advantageous to use an additional temperature sensor 4. This is advantageous in particular when temperatures of more than 143° are involved. Two temperature sensors 4 may monitor each other in this case and plausibilize their values. At the same time, the likelihood of a malfunction of both temperature sensors 4 is reduced considerably. When two temperature sensors 4 are used, it is provided, in particular, to use the higher of the two values of the measured temperature in order to obtain reliability for the automatic switch-off of control device 1. A safety concept in the event of damage to temperature sensors 4 is not necessary since a malfunction of one of temperature sensors 4 is able to be compensated for by the other temperature sensor 4.

What is claimed is:

1. A method for operating an electric control device for at least one power unit of a motor vehicle, the method comprising:
   - assigning an operating temperature range to the control device;
   - automatically switching off the control device if its temperature exceeds a maximum value of the operating temperature range; and
   - switching on the automatically switched-off control device based on a continuously recorded temperature only if its temperature is within the operating temperature range,
   - wherein the control device has two separate lines for the supply of voltage, and after the automatically switching off of the control device, one of the two separate lines continues to be supplied with voltage.

2. The method according to claim 1, wherein the power unit is one of a drive unit of the motor vehicle, a transmission of the vehicle, an automatic transmission of the vehicle, or a motor vehicle component at least one of controlled and regulated with the aid of the control device.

3. The method according to claim 1, further comprising measuring a temperature with the aid of a temperature acquisition of the control device, at least one of (a) when the control device is switched on and (b) when the control device is automatically switched off.

4. The method according to claim 3, wherein the temperature acquisition is monitored by a temperature sensor, the temperature sensor also measuring the temperature, and a higher value of the measured temperatures is used to determine the automatic switch-off of the control device.

5. The method according to claim 1, further comprising switching off a temperature acquisition when the control device is switched off manually but not automatically.

6. The method according to claim 1, wherein a stored operating temperature range is used as the operating temperature range.

7. The method according to claim 1, wherein the control device is automatically switched on after it has been switched off automatically.

\* \* \* \* \*